3,737,484
COPOLYMERS STABILIZED WITH A
THIOURACIL COMPOUND
Harold V. Wood and Terry D. Brown, Bartlesville, Okla.,
assignors to Phillips Petroleum Company
No Drawing. Filed May 7, 1971, Ser. No. 141,429
Int. Cl. C08f 19/08, 45/60
U.S. Cl. 260—880 B                          10 Claims

ABSTRACT OF THE DISCLOSURE

Resinous polymers prepared by the copolymerization of vinyl-substituted aromatic compounds and conjugated dienes utilizing an organolithium initiator, which are sometimes referred to as block copolymers, are stabilized against the effects of heat with a thiouracil compound.

---

This invention relates to the heat stabilization of resinous block copolymers formed from a conjugated diene and a vinyl-substituted aromatic compound with a thiouracil compound.

Uracil is one of a class of pyrimidines which are among the hydrolysis products of nucleic acids.

It is a tautomeric compound and its keto formula is as follows:

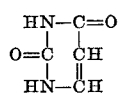

This compound, together with uracils having hydrocarbon, halogen, hydroxyl, amino and hydrazino substituents, has been proposed for the stabilization of polymers such as polyvinyl chloride, polyolefins, and interpolymers of two or more alphamonoolefins with polyenes such as butadiene (U.S. Pat. 3,436,362). A trichloromethylthio-substituted uracil containing various other substituents has been proposed for use as a herbicide (U.S. Pat. 3,360,520), but, insofar as we are aware, we are the first to use thiouracils as heat stabilizers for resinous block polymers. In the thiouracils, one or both of the oxygen atoms in the previous formula are replaced by sulfur.

According to the invention, 2-thiouracil provides outstanding results in the heat stabilization of block polymers of conjugated dienes with monovinyl-substituted aromatic monomers. In this regard, the 2-thiouracil is substantially more effective in obtaining melt flow stability at elevated temperatures than far larger amounts of a mixture of Polygard (tris-nonyl phenyl phosphite) and BHT (2,6-di-t-butyl-4-methylphenol) which has heretofore been customarily employed for such heat stabilization.

Broadly speaking, the thiouracils which can be utilized as heat stabilizers in accordance with the invention can be represented by the following formula:

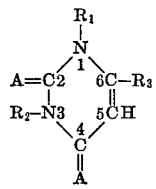

where A=sulfur or oxygen, at least one being sulfur. $R_1$, $R_2$, and $R_3$ are monovalent substituents, specifically hydrogen, alkyl, aryl or alkaryl groups containing up to 20 carbon atoms or, more advantageously, up to 8 carbon atoms.

Specific examples of the heat stabilizers of the invention are: 2-thiouracil, 4-thiouracil, 6-methyl-2-thiouracil, 3-phenyl-4-thiouracil, 1-eicosyl-2-thiouracil, 1,3-dibutyl-6-benzyl-2-thiouracil and 2,4-dithiouracil.

The term "stabilizing amount," when utilized in reference to the heat stabilizers of our invention, is intended to include any amount of thiouracil compound which provides a detectible stabilization in melt flow behavior over an extended period of time. Although the data hereinafter set out show that as little as 0.05 weight percent of thiouracil compound is effective for this purpose, smaller amounts can be used in applications where greater variation in melt flow can be tolerated but yet some stabilizing action is necessary. The following data also show that outstanding results can be obtained with 0.1 weight percent of the thiouracil compound. Of course, more can be included but there is no economic justification for doing so. Thus, while the practical limits of the amount of thiouracil compound may be set at 0.01 to 1 weight percent based on the copolymer, the use of any stabilizing amount as defined above is clearly within the scope of the invention.

The materials which are heat stabilized by the thiouracil compounds of the invention are copolymers of vinyl-substituted aromatic compounds and conjugated dienes having resinous properties, for example, a measurable melt flow. Such properties are possessed by copolymers containing 50 to 95 percent of the vinyl-substituted aromatic compound and 5 to 45 percent of the conjugated diene. When a stabilizing amount of a thiouracil compound is incorporated, the change in melt flow with time when the sample undergoes mechanical shear at high temperature is much less than that of the polymer containing no additive or a much greater amount of a combination of 1.5 parts Polygrad and 0.5 part BHT.

The conjugated dienes of the invention contain 4 to 12 carbon atoms per molecule. Specific examples are 1,3-butadiene, isoprene, piperylene, 2,3-dimethyl-1,3-butadiene, 1,3-octadiene, and 4.5-diethyl-1,3-octadiene.

The vinyl-substituted aromatic compounds can contain 8 to 20 carbon atoms. Specific examples are styrene, 2-methylstyrene, and 1-vinylnaphthalene. Copolymers of butadiene and styrene are of particular interest.

The thiouracils are especially effective in stabilizing various resinous type block copolymers of which many varieties are now known in the art. Such block polymers are prepared from organolithium initiators which can be represented by the formula $RLi_x$ wherein R is an aliphatic cycloaliphatic or aromatic radical containing from 1 to 20 carbon atoms and $x$ is an integer of from 1 to 4. Examples of such initiators include methyllithium, n-butyllithium, phenyllithium, cyclohexyllithium, 1,4-dilithiobutane, 1,4-dilithio-2-methyl-2-butene, dilithionaphthalene, 1,2-dilithio-1,2-diphenylethane, and tetralithionaphthalene. All commercial products of which we are aware utilize organomonolithium catalysts. Ethers such as tetrahydrofuran can be used to increase the initiation rate of the n-butyllithium.

Simple block polymers can be prepared, as is known to those skilled in the art, by successive charging of the monomers to a reaction zone containing the organolithium initiator under a variety of polymerization conditions.

Branched block copolymers, including the radial teleblock copolymers described in application Ser. No. 859,861 by Kitchen et al., filed Sept. 22, 1969, now U.S. 3,639,517, are stabilized by the thiouracil compounds of this invention. This application is incorporated herein by reference and the process thereof can be described briefly as contacting 40 to 90 weight percent of monovinyl-substituted aromatic hydrocarbon at temperatures up to 250° F. with an organolithium polymerization initiator, then charged the remainder of the monovinyl-substituted monomer at a higher initiator level. Thereupon, the conjugated diene is polymerized to form a block copolymer. Finally a polyfunctional treating agent capable of reacting with terminal lithium atoms on the preformed polymer is charged to the polymerization zone to form a branched polymer. Where the monovinyl-substituted compound is charged in two or more steps at different initiator levels, the resulting polymer is described as polymodal.

Polyfunctional treating agents that can be employed in the preparation of the branched block copolymers are the polyepoxides such as epoxidized linseed oil and 1,2;5,6;9,10 - triepoxydecane, polyimines such as tri(1-aziridinyl) phosphine oxide, polyisocyanates such as benzene - 1,2,4 - triisocyanate, polyaldehydes such as 1,4,7-naphthalene tricarboxyaldehyde, polyhalides such as silicon tetrachloride or polyketones such as 1,4,9,10-anthracenetetrone. The aforementioned treating agents are described in U.S. Pat. 3,281,383, issued to Zelinski et al. Oct. 25, 1966, which is incorporated by reference herein. The tin compounds disclosed in U.S. Pat. 3,393,182, issued to Trepka July 16, 1968, are also suitable as polyfunctional treating agents. Exemplary compounds are tetraallyltin and stannic fluoride. The polyvinyl aromatic compounds, such as divinylbenzene, as disclosed in U.S. Pat. 3,280,084 issued to Zelinski et al. Oct. 18, 1966, are also suitable difunctional treating agents.

The thiouracil compounds are also useful in stabilizing copolymers prepared as above described except that all of the vinyl-substituted aromatic compound is charged at one time to the polymerization zone followed by charging of the conjugated diene and polyfunctional compound. There are thus formed resinous branched block copolymers which are not polymodal in nature.

Following are specific examples of the process of the invention.

EXAMPLE I

Melt flow tests were made upon a multiple addition radial teleblock copolymer of 78 percent styrene and 22 percent butadiene. The polymer was made according to the Kitchen et al. application Ser. No. 859,861. Details are as follows:

Example of multiple addition radial teleblock copolymer 78/22 styrene/butadiene

| | Parts by weight per 100 parts total monomer |
|---|---|
| First stage: | |
| Total cyclohexane charged [a] | 448 |
| Styrene | 54.6 |
| Tetrahydrofuran | 0.10 |
| n-Butyllithium | 0.03 |
| Peak temperature, °F. | 184 |
| Time, minutes | 20 |
| Second stage: | |
| n-Butyllithium | 0.1 |
| Styrene | 23.4 |
| Peak temperature, °F. | 181 |
| Time, minutes | 28 |
| Third stage: | |
| Butadiene | 22.0 |
| Peak temperature, °F. | 198 |
| Time, minutes | 28 |
| Fourth stage: | |
| Epoxol 9-5 | 0.5 |
| Time, minutes | 10 |

[a] Approximately 83% charged to reactor initially, the remainder was divided into about 6 equal parts. Each part was used to flush catalyst, monomer or coupling agent into the reactor as needed.

In each test the polymer was maintained at 230° C. in a melt indexer with a 5 kilogram weight for the period indicated. Thereupon, the melt flow was determined in the melt indexer at 200° C. with the 5 kilogram weight (ASTM D–1238–62; Condition G). In each case, the antioxidant was sprayed onto the samples before the test was started. Following are the results for the stabilizers indicated:

Stabilizer 1—0.5 percent of a mixture of 3 parts of Polygard per part of BHT

| Melt flow, min.: | Grams per 10 minutes |
|---|---|
| 5 | 13.16 |
| 10 | 13.56 |
| 20 | 13.68 |
| 30 | 12.78 |
| 40 | 11.00 |
| 50 | 8.76 |

In this test the melt index varied by 4.92, the high value being 13.68 and the low value 8.76.

Stabilizer 2—0.05 percent 2-thiouracil

| Melt flow, min.: | Grams per 10 minutes |
|---|---|
| 5 | 11.46 |
| 10 | 12.00 |
| 20 | 12.30 |
| 30 | 12.18 |
| 40 | 11.04 |
| 50 | 10.02 |

In this case, the variation in melt flow between the high value of 12.30 and the low value of 10.02 was 2.28.

Stabilizer 3—0.1 percent 2-thiouracil

| Melt flow, min.: | Grams per 10 minutes |
|---|---|
| 5 | 11.22 |
| 10 | 11.82 |
| 20 | 13.38 |
| 30 | 13.32 |
| 40 | 13.20 |
| 50 | 12.60 |

Here, the difference between the highest melt flow value of 13.38 and the lowest value of 11.22 was 2.16 while the drop-off of the end value from the highest value was 0.78 as compared to 1.28 for the polymer stabilized with 0.05 percent 2-thiouracil.

4—No stabilizer

| Melt flow, min.: | Grams per 10 minutes |
|---|---|
| 5 | 11.16 |
| 10 | 11.58 |
| 20 | 10.98 |
| 30 | 10.50 |
| 40 | 8.58 |
| 50 | 5.34 |

The difference in melt index in this test was 6.24, the difference between the highest value of 11.58 and 5.34.

These tests show that the Polygard-BHT mixture had a substantial antioxidant effect as compared to the test where no antioxidant was employed. However, the 2-thiouracil at the 0.05 percent and 0.1 percent was more effective than 0.5 percent of the Polygard-BHT mixture.

EXAMPLE II

Another series of melt index tests were made upon a regular addition radial teleblock copolymer of 75 percent styrene and 25 percent butadiene. Details of preparation were as follows:

Example of regular addition radial teleblock copolymer 75/25 styrene/butadiene

| | Parts by weight per 100 parts total monomer |
|---|---|
| First stage: | |
| Total cyclohexane charged [a] | 393.3 |
| Styrene | 75.0 |
| Tetrahydrofuran | 0.09 |
| n-Butyllithium | .10 |
| Peak temperature, °F. | 175 |
| Time, minutes | 20 |

See footnotes at end of table.

TABLE—Continued

|  | Parts by weight per 100 parts total monomer |
|---|---|
| Second stage: |  |
| Butadiene | 25 |
| Peak temperature, °F. | 165 |
| Time, minutes | 25 |
| Third stage: |  |
| Epoxol 9–5 [b] | 0.5 |
| Time, minutes | 10 |

[a] Approximately 54% was charged to reactor initially. The remainder was divided into 4 equal parts and used to flush catalyst, monomers and coupling agent into the reactor as they were needed.
[b] Epoxidized linseed oil having an average of 5.5 functional epoxide groups per mole. It is a product of Swift & Co.

In each case, the samples were prepared by mixing the polymer/stabilizer blends in a Brabender Plastograph for 10 minutes at 212° C. (414° F.). The Brabender Plastograph is a small, high intensity mixer, akin to a Banbury mixer, which is commonly used in polymer evaluation work. The stabilizers hereinafter noted were added to the sample by forming a solution or dispersion of them in an organic liquid such as acetone, toluene or cyclohexane, and spraying the mixture onto the polymer. The solvent or slurry medium was evaporated from the treated sample, and the sample was then mixed in the Brabender Plastograph to disperse the stabilizing system with the molten polymer. The data were as follows on tests run in the same manner as described in connection with Example I:

Stabilizer 1—0.5 percent of a mixture of 3 parts Polygard per part BHT

Melt flow
Grams per 10 minutes
11.60
12.20
10.00
7.80

This sample showed a difference in melt flow of 4.40 between the highest value of the test of 12.20 and the low value of 7.80.

Stabilizer 2—0.1 percent 2-thiouracil

Melt flow
Grams per 10 minutes
9.48
9.80
8.96
9.48

This test showed a variation of 0.84 between the high value of 9.80 and the low value of 8.96.

Thus, 0.1 percent 2-thiouracil was substantially more effective as a thermal stabilizing agent than 0.5 percent of the Polygard-BHT mixture with the regular addition radial teleblock copolymer.

Other variations and modifications of this invention will be apparent to those skilled in the art without departing from the spirit and scope of the invention.

We claim:

1. A resinous block copolymer of a conjugated diene containing 4 to 12 carbon atoms per molecule with a monovinyl-substituted aromatic compound containing 8 to 20 carbon atoms containing a stabilizing amount of a thiouracil compound having the formula

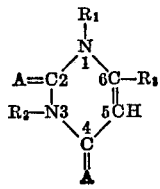

where A=sulfur or oxygen, at least one being sulfur, and $R_1$, $R_2$ and $R_3$ are hydrogen, alkyl, aryl or alkaryl groups containing up to 20 carbon atoms.

2. The compound of claim 1 wherein the copolymer contains 50 to 95 percent of the monovinyl-substituted aromatic compound and 5 to 45 percent of the conjugated diene. and the $R_1$, $R_2$, and $R_3$ substitutuents of the thiouracil compound contain up to 8 carbon atoms.

3. The composition of claim 2 wherein the copolymer is formed from 1,3-butadiene and styrene and the amount of thiouracil compound is 0.1 to 1 weight percent based on the copolymer.

4. The composition of claim 3 wherein the copolymer is a branched block copolymer.

5. The composition of claim 4 wherein the heat stabilizer is 2-thiouracil.

6. The composition of claim 4 wherein the stabilizer is 4-thiouracil.

7. A resinous block copolymer containing 50 to 95 percent styrene and 5 to 45 percent 1,3-butadiene prepared by successively contacting the butadiene and styrene, said butadiene all being added in one stage, with an organolithium initiator represented by the formula $RLi_x$ wherein R is an aliphatic, cycloaliphatic or aromatic radical containing 1 to 20 carbon atoms and $x$ is an integer of 1 to 4, said polymer containing a stabilizing amount of a thiouracil having the formula

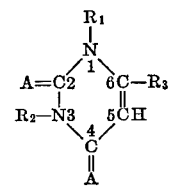

where A=sulfur or oxygen, at least one being sulfur, and $R_1$, $R_2$ and $R_3$ are hydrogen, alkyl, aryl or alkaryl groups containing up to 20 carbon atoms.

8. The composition of claim 7 wherein the uracil compound is 2-thiouracil and is present in the amount of 0.01 to 1 weight percent based on the copolymer.

9. The composition of claim 7 wherein the thiouracil compound is 4-thiouracil and is present in the amount of 0.01 to 1 weight percent based on the copolymer.

10. The composition of claim 7 wherein the thiouracil compound is 2,4-dithiouracil and is present in the amount of 0.01 to 1 weight percent based on the copolymer.

References Cited

UNITED STATES PATENTS

| 2,126,269 | 8/1938 | Messer | 260—251 R |
| 3,277,045 | 10/1966 | Bonvicini | 260—45.8 |
| 3,436,362 | 4/1969 | Hayer et al. | 260—23.7 |
| 3,563,971 | 2/1971 | Wood et al. | 260—93.7 |
| 3,591,521 | 7/1971 | Nobukuni et al. | 260—45.8 |

JAMES A. SEIDLECK, Primary Examiner

U.S. Cl. X.R.

260—45.8 N, 879